US010162962B1

(12) United States Patent
Glick et al.

(10) Patent No.: US 10,162,962 B1
(45) Date of Patent: Dec. 25, 2018

(54) SYSTEMS AND METHODS FOR DETECTING CREDENTIAL THEFT

(71) Applicant: Symantec Corporation, Mountain View, CA (US)

(72) Inventors: Adam Glick, Culver City, CA (US); Brian Schlatter, Playa Vista, CA (US); Feng Li, Ontario (CA); Akshata Krishnamoorthy Rao, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 135 days.

(21) Appl. No.: 15/265,802

(22) Filed: Sep. 14, 2016

(51) Int. Cl.
*G06F 21/55* (2013.01)
*G06F 21/62* (2013.01)

(52) U.S. Cl.
CPC .......... *G06F 21/55* (2013.01); *G06F 21/6209* (2013.01)

(58) Field of Classification Search
CPC ............................. G06F 21/55; G06F 21/6209
USPC ...................................................... 726/22–25
See application file for complete search history.

(56) References Cited

U.S. PATENT DOCUMENTS

| 8,307,433 | B2 * | 11/2012 | Yue ....................... | G06F 21/554 380/33 |
| 8,695,097 | B1 * | 4/2014 | Mathes ................... | H04L 63/08 726/25 |
| 2009/0249014 | A1 * | 10/2009 | Obereiner ........... | G06F 12/1441 711/164 |
| 2010/0077483 | A1 * | 3/2010 | Stolfo .................... | G06F 21/554 726/24 |
| 2011/0265158 | A1 * | 10/2011 | Cha ......................... | G06F 21/57 726/6 |
| 2014/0157407 | A1 * | 6/2014 | Krishnan ................ | G06F 21/50 726/22 |
| 2014/0298469 | A1 * | 10/2014 | Marion ................... | G06F 21/55 726/23 |

(Continued)

OTHER PUBLICATIONS

Ziegler et al., "Do you think your passwords are secure?," 2014 International Conference on Privacy and Security in Mobile Systems (PRISMS) Year: 2014.*

(Continued)

*Primary Examiner* — Roderick Tolentino
(74) *Attorney, Agent, or Firm* — Fisher Broyles, LLP

(57) ABSTRACT

The disclosed computer-implemented method for detecting credential theft may include (i) monitoring a secured computing system's credential store that may include at least one sensitive credential that may be used to facilitate authentication of a user that is attempting to access the secured computing system, (ii) gathering, while monitoring the credential store, primary evidence of an attempted theft of the sensitive credential from the credential store, (iii) gathering corroborating evidence of the attempted theft of the sensitive credential, and (iv) performing a security action in response to gathering the primary evidence and the corroborating evidence of the attempted theft. The primary evidence of the attempted theft of the sensitive credential may include evidence of any suspicious access of the sensitive credential from the credential store that occurs outside of a procedure of authenticating the user. Various other methods, systems, and computer-readable media are also disclosed.

20 Claims, 6 Drawing Sheets

(56) References Cited

U.S. PATENT DOCUMENTS

2014/0337937 A1* 11/2014 Truskovsky ............ H04L 63/08
                                                              726/5
2015/0358338 A1* 12/2015 Zeitlin ................ H04L 63/1416
                                                              726/23
2016/0088000 A1*  3/2016 Siva Kumar ......... H04L 63/083
                                                              726/23

OTHER PUBLICATIONS

Suarez et al., "Faux Disk Encryption: Realities of Secure Storage on Mobile Devices," 2016 IEEE/ACM International Conference on Mobile Software Engineering and Systems (MOBILESoft) Year: 2016.*

Ilya Sokolov et al.; Systems and Methods for Detecting Anomalous Behaviors of Limited-Purpose Devices; U.S. Appl. No. 14/645,892, filed Mar. 12, 2015.

Heng Yin et al.; Whole-system Fine-grained Taint Analysis for Automatic Malware Detection and Analysis; http://bitblaze.cs.berkeley.edu/papers/malware-detect.pdf; on or before Jan. 23, 2013.

Attivo Networks; http://attivonetworks.com; Nov. 14, 2012.

Petros Efstathopoulos et al.; Labels and Event Processes in the Asbestos Operating System; http://www.scs.stanford.edu/~dm/home/papers/efstathopoulos:asbestos.pdf; SOSP'05; Oct. 23-26, 2005.

Champ Clark; Detecting "Pass-the-hash" attacks with Sagan in real time.; Jun. 16, 2014 https://quadrantsec.com/about/blog/detecting_pass_the_hash_attacks_with_sagan_in_real_time/.

Spotting the Adversary with Windows Event Log Monitoring; https://www.nsa.gov/ia/files/app/Spotting_the_Adversary_with_Windows_Event_Log_Monitoring.pdf; Information Assurance Directorate; Feb. 28, 2013.

Chris Martin; Detecting Lateral Movement From 'Pass the Hash' Attacks; https://logrhythm.com/blog/detecting-lateral-movement-from-pass-the-hash-attacks/; Feb. 2, 2015.

Ari Juels et al.; Honeywords: Making Password-Cracking Detectable; https://people.csail.mit.edu/rivest/pubs/JR13.pdf; CCS'13; Nov. 4-8, 2013.

Bashar Ewaida; Pass-the-hash attacks: Tools and Mitigation; https://www.sans.org/reading-room/whitepapers/testing/pass-the-hash-attacks-tools-mitigation-33283; Jan. 21, 2010.

* cited by examiner

SYSTEMS AND METHODS FOR DETECTING CREDENTIAL THEFT

BACKGROUND

Targeted threats are a growing problem in the world of information security. Sometimes referred to as advanced persistent threats (APTs), targeted threats may include stealthy and continuous hacking processes, orchestrated by groups that are capably of effectively targeting a specific entity. APTs may originate from nation-states or organized crime and may threaten the security of an organization in a variety of ways. Sensitive data is commonly targeted, causing monetary and reputation damages to affected organizations. APTs may be designed to steal intellectual property, financial details of customers and employees, organizational strategy information, or any other type of confidential data. APTs may also be designed to destroy valuable data or sabotage computer-controlled systems.

A typical targeted attack on a secured computing system may involve various stages such as incursion, exploration, pivoting, and exfiltration. One key prerequisite of some or all of these stages may include the theft of sensitive credentials that may be used to escalate privilege, pivot within the secured computing system, or otherwise weaken the security measures employed by the secured computing system. The instant disclosure, therefore, identifies and addresses a need for systems and methods for detecting credential theft.

SUMMARY

As will be described in greater detail below, the instant disclosure describes various systems and methods for detecting credential theft. In one example, a system for detecting credential theft may include several modules stored in memory, including (i) a monitoring module that (a) monitors a secured computing system's credential store that may include at least one sensitive credential that is used to facilitate authentication of a user that is attempting to access the secured computing system and (b) gathers, while monitoring the credential store, primary evidence of an attempted theft of the sensitive credential from the credential store, (ii) a corroborating module that gathers corroborating evidence of the attempted theft of the sensitive credential, and (iii) a security module that performs a security action in response to the primary evidence and the corroborating evidence of the attempted theft. The system may also include at least one physical processor that executes the monitoring module, the corroborating module, and the security module. In some examples, the primary evidence of the attempted theft of the sensitive credential may include evidence of any suspicious access of the sensitive credential from the credential store that occurs outside of a procedure of authenticating the user.

In one embodiment, a method for detecting credential theft may include (i) monitoring a secured computing system's credential store that may include at least one sensitive credential that is used to facilitate authentication of a user that is attempting to access the secured computing system, (ii) gathering, while monitoring the credential store, primary evidence of an attempted theft of the sensitive credential from the credential store, (iii) gathering corroborating evidence of the attempted theft of the sensitive credential, and (iv) performing a security action in response to gathering the primary evidence and the corroborating evidence of the attempted theft. In this example, the primary evidence of the attempted theft of the sensitive credential may include evidence of any suspicious access of the sensitive credential from the credential store that occurs outside of a procedure of authenticating the user.

In at least one example, the step of gathering the corroborating evidence of the attempted theft of the sensitive credential may include detecting an attempt to exfiltrate the sensitive credential from the secured computing system, and the step of performing the security action may include blocking the attempt to exfiltrate the sensitive credential from the secured computing system. In some examples, the suspicious access of the sensitive credential from the credential store may be made by a suspicious computer process and may generate a copy of the sensitive credential within the secured computing system. In these examples, the step of detecting the attempt to exfiltrate the sensitive credential from the secured computing system may include (i) tracking, in response to gathering the primary evidence of the attempted theft, additional copies of the sensitive credential that are derived from the copy of the sensitive credential as the additional copies are propagated throughout the secured computing system and (ii) detecting an attempt to exfiltrate one of the additional copies from the secured computing system.

In at least one example, the step of gathering the corroborating evidence of the attempted theft of the sensitive credential may include detecting a use of the secure credential in attempting to launch of a computer process within the secured computing system, and the step of performing the security action may include preventing the computer process from performing any malicious action within the secured computing system. In other examples, the step of gathering the corroborating evidence of the attempted theft of the sensitive credential may include detecting an attempt to access the secured computing system using the secure credential, and the step of performing the security action may include blocking the attempt to access the secured computing system.

In other examples, the step of performing the security action may include blocking the attempted theft of the sensitive credential, alerting an interested party of the attempted theft, revoking access rights associated with the sensitive credential, and/or alerting an interested party of a breach of the secured computing system.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor a secured computing system's credential store that may include at least one sensitive credential that is used to facilitate authentication of a user that is attempting to access the secured computing system, (ii) gather, while monitoring the credential store, primary evidence of an attempted theft of the sensitive credential from the credential store, (iii) gather corroborating evidence of the attempted theft of the sensitive credential, and (iv) perform a security action in response to gathering the primary evidence and the corroborating evidence of the attempted theft. In this example, the primary evidence of the attempted theft of the sensitive credential may include evidence of any suspicious access of the sensitive credential from the credential store that occurs outside of a procedure of authenticating the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
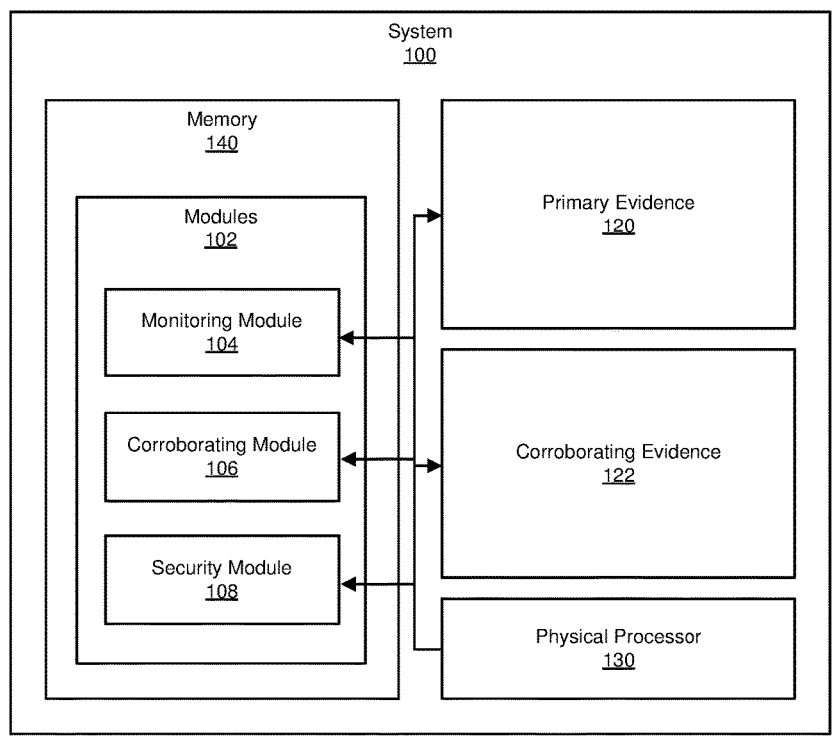
FIG. 1 is a block diagram of an example system for detecting credential theft.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting credential theft. As will be explained in greater detail below, by treating an unusual access of a credential store as primary evidence of credential theft and then identifying additional corroborating evidence of credential theft, the systems and methods described herein may determine with a high level of confidence if the unusual access of the credential store was or was not a part of an attempted theft of a sensitive credential. Furthermore, in some examples, by detecting the theft of sensitive credentials, these systems and methods may also detect a targeted attack, of which the theft is a part, at an early stage (e.g., before objectives of the targeted attack have been successfully completed). For example, by detecting a targeted attack that is in progress at the credential-theft stage, the systems and methods described herein may prevent any exploration, privilege-escalating, pivoting, and/or exfiltration stages of the targeted attack.

In addition, the systems and methods described herein may improve the functioning of a computing device by increasing the security of sensitive credentials stored on the computing device and by increasing the security of the computing device itself. These systems and methods may also improve the fields of credential-theft and targeted-attack detection by improving the speed and accuracy at which credential thefts and targeted attacks are detected (e.g., by reducing or eliminating false positive detections).

Embodiments of the instant disclosure may also provide various other advantages and features, as discussed in greater detail below.

Figure 2:
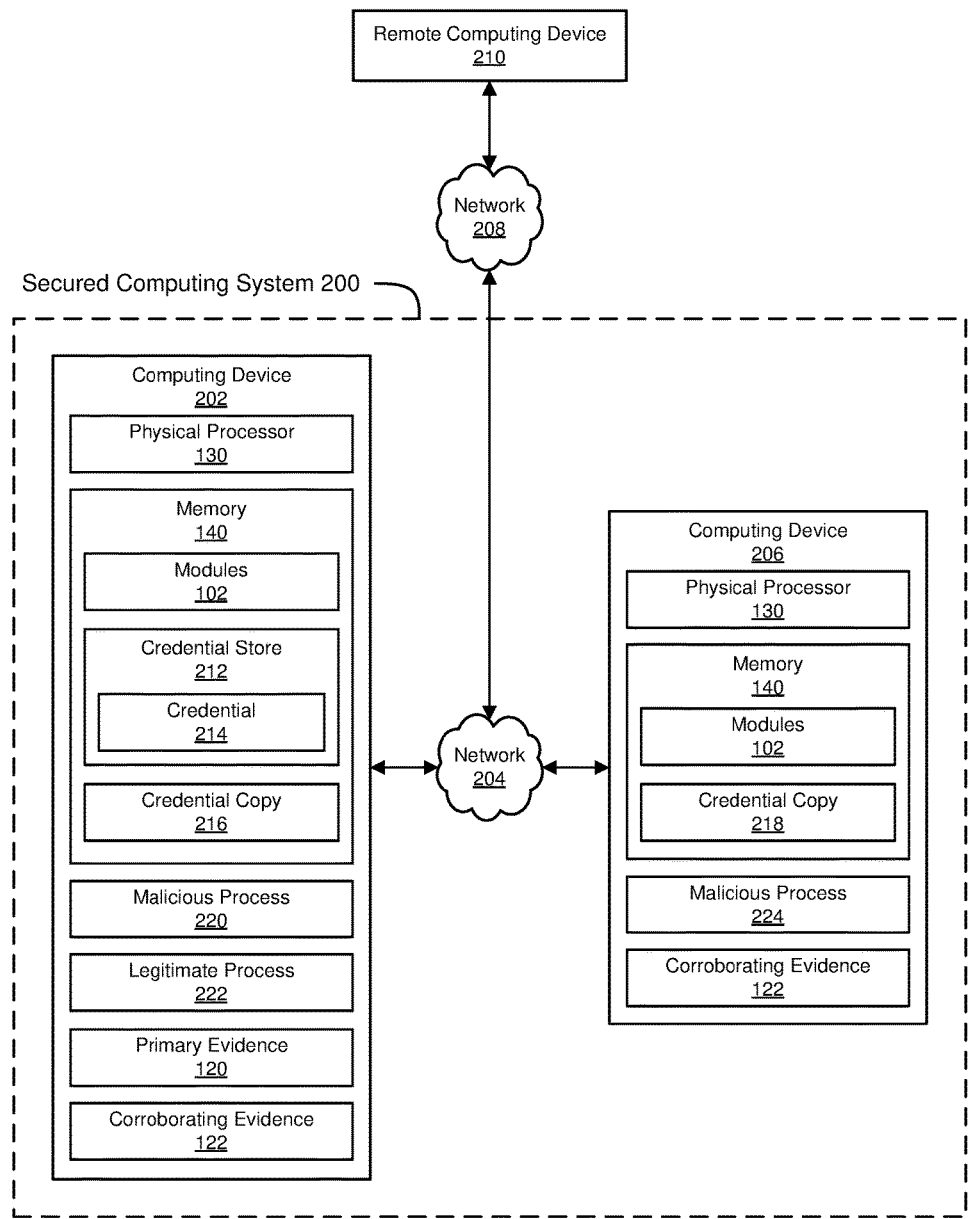
FIG. 2 is a block diagram of an additional example system for detecting credential theft.

The following will provide, with reference to FIGS. 1-2, detailed descriptions of example systems for detecting credential theft. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an example system 100 for detecting credential theft. As illustrated in this figure, example system 100 may include one or more modules 102 for performing one or more tasks. As will be explained in greater detail below, modules 102 may include a monitoring module 104, a corroborating module 106, and a security module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or computing device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting credential theft. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include primary evidence 120 and corroborating evidence 122. Primary evidence 120 generally represents any type or form of information about a detected event that may suggest or indicate that a credential theft has occurred. Corroborating evidence 122 generally represents any type or form of information about a detected event that may support or corroborate a suggestion or an indication of a credential theft. In some examples, primary evidence 120 may represent any type or form of information about a detected event that if solely relied upon for the detection of credential-theft events may result in an unacceptable number of false-positive detections. Corroborating evidence 122 may represent any type or form of information about a detected event that if used in combination with primary evidence 120 for the detection of credential-theft events may result in no or an acceptable number of false-positive detections.

Example system 100 in FIG. 1 may be implemented in a variety of ways. For example, all or a portion of example system 100 may represent portions of example secured computing system 200 in FIG. 2. As shown in FIG. 2, system 200 may include a computing device 202 in communication with a computing device 206 via a network 204. In one example, all or a portion of the functionality of modules 102 may be performed by computing device 202, computing device 206, and/or any other suitable computing system. As will be described in greater detail below, one or more of modules 102 from FIG. 1 may, when executed by at least one processor of computing device 202 and/or computing device 206, enable computing device 202 and/or computing device 206 to detect credential theft. In some examples, secured computing system 200 may represent one or more computing devices of an entity that have been secured from unauthorized access using sensitive credentials. As used herein, the term "entity" generally refers to any organization (e.g., a business or government unit), individual, group of related individuals, and/or department within an organization.

Computing device 202 and computing device 206 generally represent any type or form of computing device capable of reading computer-executable instructions. Examples of computing device 202 and/or computing device 206 include, without limitation, laptops, tablets, desktops, servers, networking devices, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. Additional examples of computing device 202 and/or computing device 206 include, without limitation, security servers, application servers, web servers, storage servers, and/or database servers configured to run certain software applications and/or provide various security, web, storage, and/or database services.

As shown in FIG. 2, computing device 202 may include a credential store 212 that stores one or more sensitive credentials (e.g., credential 214), a malicious process 220, and a legitimate process 222, and computing device 206 may include malicious process 224. Credential store 212 generally represents any type or form of storage that contains sensitive credentials. Examples of credential store 212 may include, without limitation, an account database (e.g., a Security Account Manager (SAM) database), memory of a security-policy process (e.g., memory of a Local Security Authority Subsystem Service (LSASS) process), a directory service (e.g., Active Directory), a credential manager (e.g., MICROSOFT's CREDENTIAL MANAGER), a location within a system registry that contains sensitive credentials (e.g., a location within a WINDOWS registry that contains Local Security Authority (LSA) secrets), a credential vault, and/or any other password storage area.

Credential 214 generally represents any sensitive credential that is stored within credential store 212. As used herein, the term "sensitive credential" may refer to any raw credential (e.g., an unencrypted credential), any encrypted credential, and/or any hashed credential. In some examples, the term "sensitive credential" may refer to any type or form of string, input, certificate, and/or signature that may be provided to an application or service by a user or entity in order to facilitate the user accessing content within the application or service. Additionally or alternatively, the term "sensitive credential" may refer to any type or form of hash, string, input, certificate, and/or signature that may be derived from another string, input, certificate, and/or signature that is provided by a user or entity in order to facilitate the user accessing content within the application or service. In one example, a sensitive credential may represent a username and/or password of a user. In another example, a sensitive credential may represent any of a variety of cryptographic keys assigned to a user and/or assigned to a device associated with a user.

Malicious process 220 and malicious process 224 generally represent any computer process that an attacker may use to perpetrate credential theft or otherwise carry out a targeted attack on secured computing system 200. Legitimate process 222 generally represents a computer process that may access secure credentials from a credential store for a legitimate or benign purpose but that is not known to perform any part of a legitimate procedure of authenticating users.

Networks 204 and 208 generally represent any medium or architecture capable of facilitating communication or data transfer. In one example, network 204 may facilitate communication between computing device 202 and computing device 206, and network 208 may facilitate communication between computing device 202 or computing device 206 and remote computing device 210. In this example, network 204 or network 208 may facilitate communication or data transfer using wireless and/or wired connections. Examples of network 204 and network 208 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Remote computing device 210 generally represents any type or form of computing device that is located outside of secured computing system 200. In some examples, remote computing device 210 may represent a server to which an attacker may attempt to transmit stolen credentials. In another example, remote computing device 210 may represent a computing device of an attacker from which the attacker may attempt to remotely log into secured computing system 200 using stolen credentials.

Figure 3:
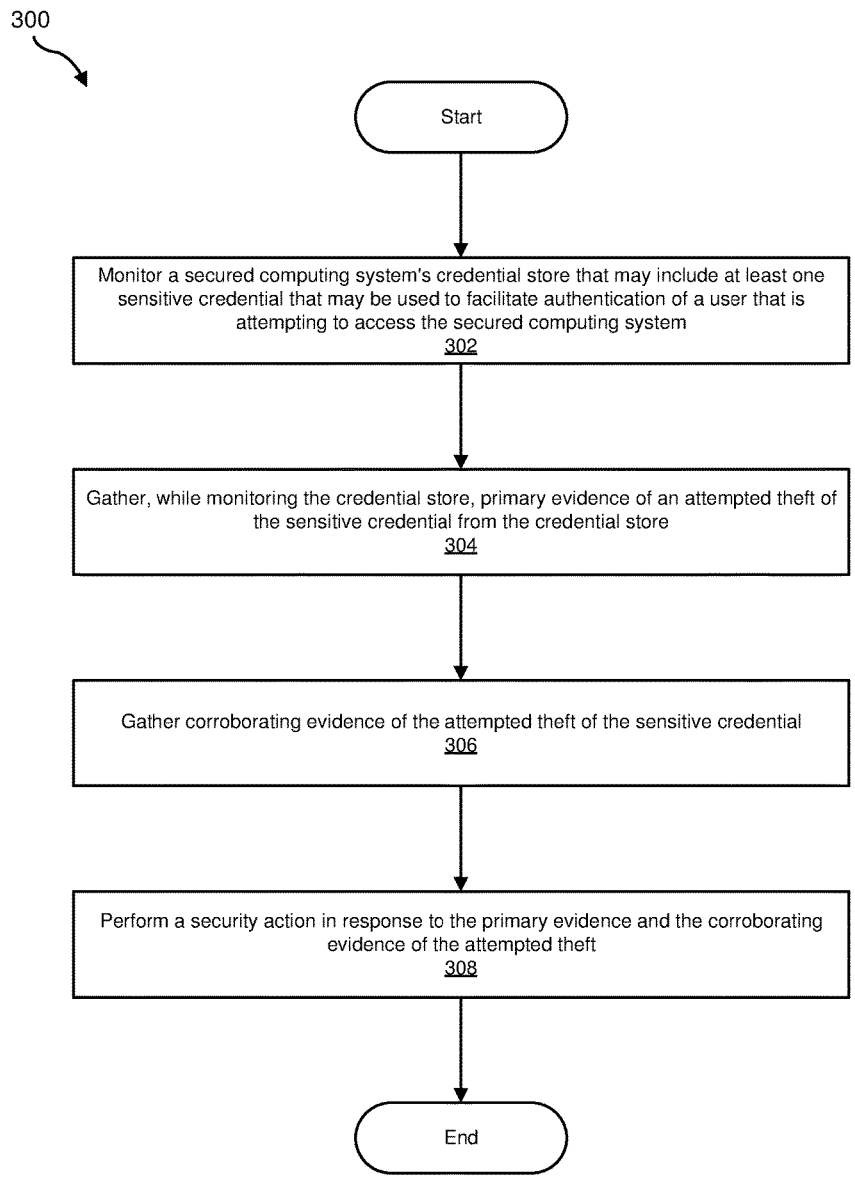
FIG. 3 is a flow diagram of an example method for detecting credential theft.
Figure 4:
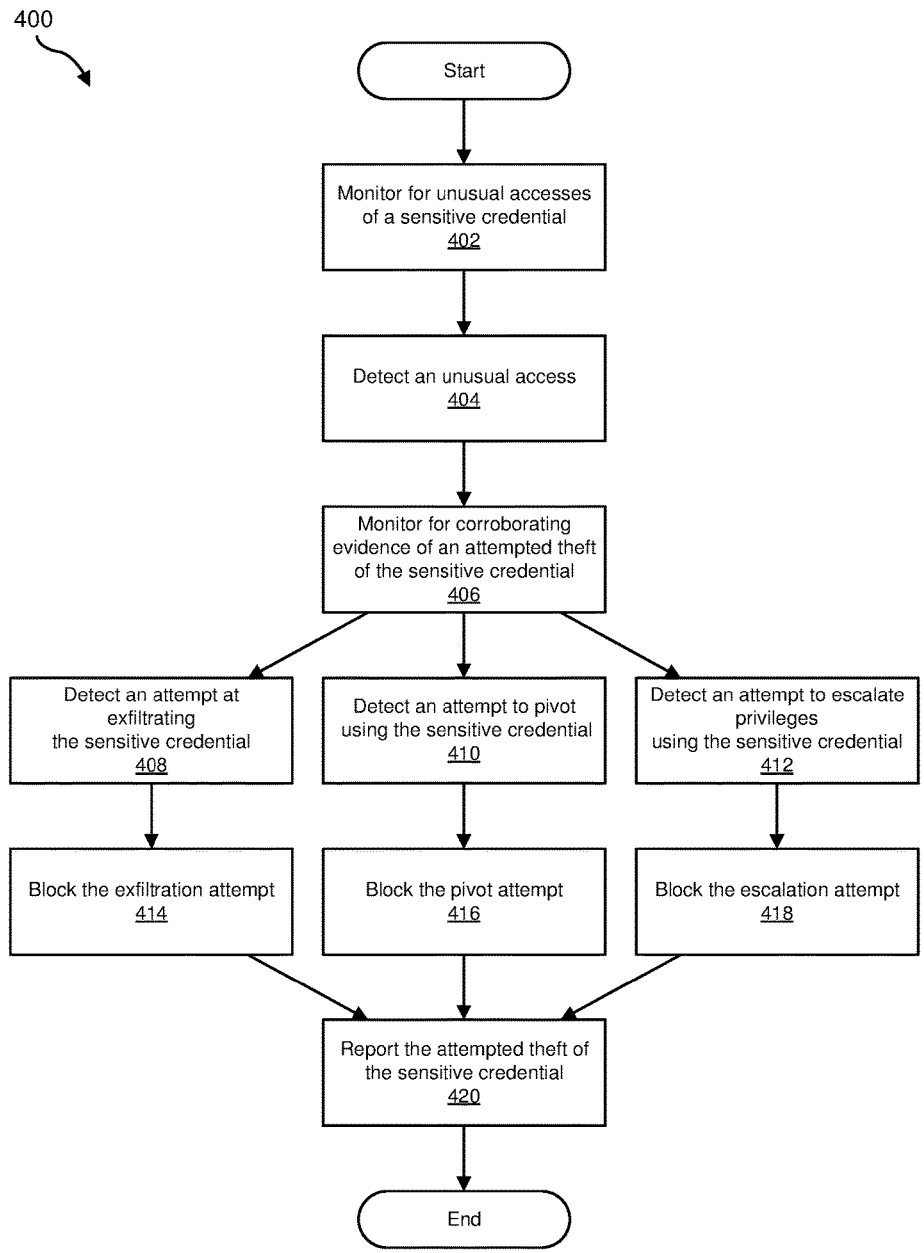
FIG. 4 is a flow diagram of an example method for detecting credential theft.

FIG. 3 is a flow diagram of an example computer-implemented method 300 for detecting credential theft. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below. FIG. 4 is a flow diagram of example computer-implemented method 400 for detecting credential theft. In one example, each of the steps shown in FIG. 4 may represent various steps and sub-steps of example computer-implemented method 300.

As illustrated in FIG. 3, at step 302 one or more of the systems described herein may monitor a secured computing system's credential store that may include at least one sensitive credential that may be used to facilitate authentication of a user that is attempting to access the secured computing system. For example, monitoring module 104 may, as part of computing device 202 in FIG. 2, monitor credential store 212 of secured computing system 200 that may include sensitive credential 214 that may be used to facilitate authentication of a user that is attempting to access secured computing system 200.

The systems described herein may monitor a secured computing system's credential store in any suitable manner. In some examples, as shown in FIG. 4 at step 402, monitoring module 104 may monitor a credential store by monitoring for suspicious or unusual accesses of sensitive credentials from the credential store. As used herein, the term "suspicious access" and/or the term "unusual access" generally refer to any access of a sensitive credential from a credential store that is performed by a computer process that is not known to perform any part of a legitimate procedure of authenticating users and/or any access that is performed in a manner that is not known to be used by such computer processes. Additionally or alternatively, the term "suspicious access" and/or the term "unusual access" generally refer to any access of a sensitive credential from a credential store that is performed in a manner that is used by known hash-dumping and/or password-extraction tools, such as CACHEDUMP, FGDUMP, FIND TOKEN, GSECDUMP, INCOGNITO, LSLSASS, MIMIKATZ, POWERDUMP, PWDUMP6, PWDUMP7, and PWDUMPX.

Monitoring module 104 may monitor for suspicious or unusual accesses of sensitive credentials from a credential store by detecting attempts to read from the credential store and by monitoring various aspects of the attempts. For example as part of monitoring an attempt to read sensitive credentials from the credential store, monitoring module 104 may identify and/or monitor the process that is attempting to read from the credential store, the data that the process is attempting to read from the credential store, the area within the credential store from which the process is attempting to access, the manner in which the attempt is being made, an additional process from which the attempt originated, and/or any other information that may be used to determine whether the attempt is being made as part of credential theft, a benign operation on the credential store, or a legitimate procedure for authenticating users.

At step 304, one or more of the systems described herein may gather, while monitoring the credential store, primary evidence of an attempted theft of the sensitive credential from the credential store. For example, monitoring module 104 may, as part of computing device 202 in FIG. 2, gather primary evidence 120 of an attempted theft of sensitive credential 214 from credential store 212.

The systems described herein may gather primary evidence of attempted thefts of sensitive credentials in any suitable manner. In some examples, as shown in FIG. 4 at step 404, monitoring module 104 may gather primary evidence of an attempted theft of a sensitive credential by detecting a suspicious or unusual access of the sensitive credential from a credential store. In some examples, monitoring module 104 may detect a suspicious or unusual access of a sensitive credential by detecting an attempt to access the sensitive credential by a computer process that is not known to perform any part of a legitimate procedure of authenticating users and/or by detecting an attempt to access the sensitive credential in a manner that is not known to be used to authenticate users. For example, monitoring module 104 may detect an unusual access of a sensitive credential by detecting an attempt by an unknown computer process to read from a location (e.g., a specific registry key or memory location) within a credential store that is known to contain sensitive credentials (e.g., the registry key "HKEY_LOCAL_MACHINE\SAM\SAM\Domains\ Account" of a WINDOWS registry). In another example, monitoring module 104 may detect an unusual access of a sensitive credential by detecting an attempt by an unknown process to access the sensitive credential via memory scraping (e.g., using the function "OpenProcess" or "ReadProcessMemory") and/or code injection. In some examples, monitoring module 104 may detect a suspicious or unusual access of a sensitive credential from a credential store by detecting an attempt to access the sensitive credential in a manner that is used by known hash-dumping and password-extraction tools.

In some examples, the way in which a sensitive credential is accessed may, by itself, be sufficient to indicate with high confidence that the sensitive credential is being stolen. However in many cases, the way in which a sensitive credential is accessed may, by itself, be insufficient to indicate with high confidence that the sensitive credential is being stolen because at least some good, legitimate, or otherwise benign processes (e.g., legitimate process 222 in FIG. 2) may access sensitive credentials in the same or a similar way. For at least this reason, the systems and methods described herein may, once primary evidence of a credential theft has been detected, search for additional corroborating evidence of the credential theft.

At step 306, one or more of the systems described herein may gather corroborating evidence of the attempted theft of the sensitive credential. For example, corroborating module 106 may, as part of computing device 202 and/or computing device 206 in FIG. 2, gather corroborating evidence 122 of an attempted theft of sensitive credential 214 from credential store 212.

The systems described herein may gather corroborating evidence of an attempted theft of a sensitive credential in any suitable manner. In some examples, as shown in FIG. 4 at step 406, corroborating module 106 may begin monitoring for corroborating evidence of an attempted theft of a sensitive credential in response to the detection of an unusual access of the sensitive credential from a credential store. In general, the systems and methods disclosed herein may consider any attempt to exfiltrate a sensitive credential from a secured computing system, any attempt to pivot within the secured computing system using the sensitive credential, and/or any attempt to escalate privileges using the sensitive credential as corroborating evidence of an attempted theft of the sensitive credential.

In one example, as shown in FIG. 4 at step 408, corroborating module 106 may gather corroborating evidence of an attempted theft of a sensitive credential by detecting an attempt at exfiltrating the sensitive credential. For example, corroborating module 106 may, after detecting an unusual attempt by malicious process 220 to access credential 214, detect an attempt by malicious process 220 to transmit credential 214 to remote computing device 210. In at least one example, corroborating module 106 may detect an attempt by malicious process 220 to transmit credential 214 to remote computing device 210 by detecting, after detecting the unusual attempt by malicious process 220 to access credential 214, an attempt by malicious process 220 to transmit any data (e.g., encrypted data that may include credential 214) to remote computing device 210.

In some examples, a malicious process may generate one or more additional copies of a sensitive credential after accessing the sensitive credential from a credential store. For example, malicious process 220 may generate credential copy 216 from credential 214 that may be stored at computing device 202 and/or may transmit an additional copy (i.e., credential copy 218) of credential 214 that may be stored at computing device 206. In examples such as these, corroborating module 106 may detect an attempt to exfiltrate a sensitive credential from a secured computing system by (i) tracking (e.g., using dynamic taint analysis) copies of the sensitive credential as they are propagated throughout the secured computing system and (ii) detecting an attempt to exfiltrate one of the copies from the secured computing system. For example, corroborating module 106 may, after detecting an unusual attempt by malicious process 220 to access credential 214, detect an attempt by malicious process 220 to transmit credential copy 216 to remote computing device 210. Additionally or alternatively, corroborating module 106 may, after detecting an unusual attempt by malicious process 220 to access credential 214, detect an attempt by malicious process 224 to transmit credential copy 218 to remote computing device 210.

In some examples, as shown in FIG. 4 at step 410, corroborating module 106 may gather corroborating evidence of an attempted theft of a sensitive credential by detecting an attempt to pivot using the sensitive credential. In one example, corroborating module 106 may detect an attempt to pivot using a sensitive credential by detecting a successful or unsuccessful attempt to log onto a computing device within the secured computing system using the sensitive credential. For example, corroborating module 106 may, after detecting an unusual attempt by malicious process 220 to access credential 214, detect an attempt by a user of remote computing device 210 to log onto computing device 206 using credential 214.

In some examples, as shown in FIG. 4 at step 412, corroborating module 106 may gather corroborating evidence of an attempted theft of the sensitive credential by detecting an attempt to escalate privileges using the sensitive credential. In one example, corroborating module 106 may detect an attempt to escalate privileges using the sensitive credential by detecting a successful or unsuccessful attempt at launching a process with the sensitive credential.

At step 308, one or more of the systems described herein may perform a security action in response to the primary evidence and the corroborating evidence of the attempted theft. For example, security module 108 may, as part of computing device 202 and/or computing device 206 in FIG. 2, perform a security action in response to primary evidence 120 and corroborating evidence 122 of an attempted theft of sensitive credential 214 from credential store 212.

The systems described herein may perform step 308 in any suitable manner. For example, in response to identifying both primary evidence and collaborating evidence of an attempted theft of a security credential, security module 108 may attempt to block the attempted theft of the sensitive credential. In one example, security module 108 may attempt to block the attempted theft of the sensitive credential by attempting to block any attempts to exfiltrate the sensitive credential from the secured computing system (e.g., as shown at step 414 in FIG. 4).

In addition to or as an alternative to blocking an attempted theft of a sensitive credential, security module 108 may alert an interested party (e.g., an incident responder) of the attempted theft (e.g., as shown at step 420 in FIG. 4) and/or a breach in progress of the secured computing system. In some examples, security module 108 may provide to the interested party information that identifies and describes the computing devices, user accounts, remote actors, and/or computer processes that were involved in the attempted theft of the sensitive credential.

In some examples, in response to identifying both primary and collaborating evidences of an attempted theft of a security credential, security module 108 may attempt to halt a breach of the secured computing system of which the attempted theft is a part. Security module 108 may attempt to halt the breach of the secured computing system by revoking access rights associated with the sensitive credential, by locking down access to resources within the secured computing system, by blocking any attempts to pivot using the sensitive credential (e.g., as shown at step 416 in FIG. 4), by isolating a computing device at which primary or collaborating evidence was identified from other computing devices within the secured computing system, by re-imaging the computing device, and/or by blocking any attempts to escalate privileges using the sensitive credential (e.g., as shown at step 418 in FIG. 4). Upon completion of step 308, exemplary method 300 in FIG. 3 may terminate.

As explained above, by treating an unusual access of a credential store as primary evidence of credential theft and then identifying additional corroborating evidence of credential theft, the systems and methods described herein may determine with a high level of confidence if the unusual access of the credential store was or was not a part of an attempted theft of a sensitive credential. Furthermore, in some examples, by detecting the theft of sensitive credentials, these systems and methods may also detect a targeted attack, of which the theft is a part, at an early stage (e.g., before objectives of the targeted attack have been successfully completed). For example, by detecting a targeted attack that is in progress at the credential-theft stage, the systems and methods described herein may prevent any exploration, privilege-escalating, pivoting, and/or exfiltration stages of the targeted attack.

Figure 5:
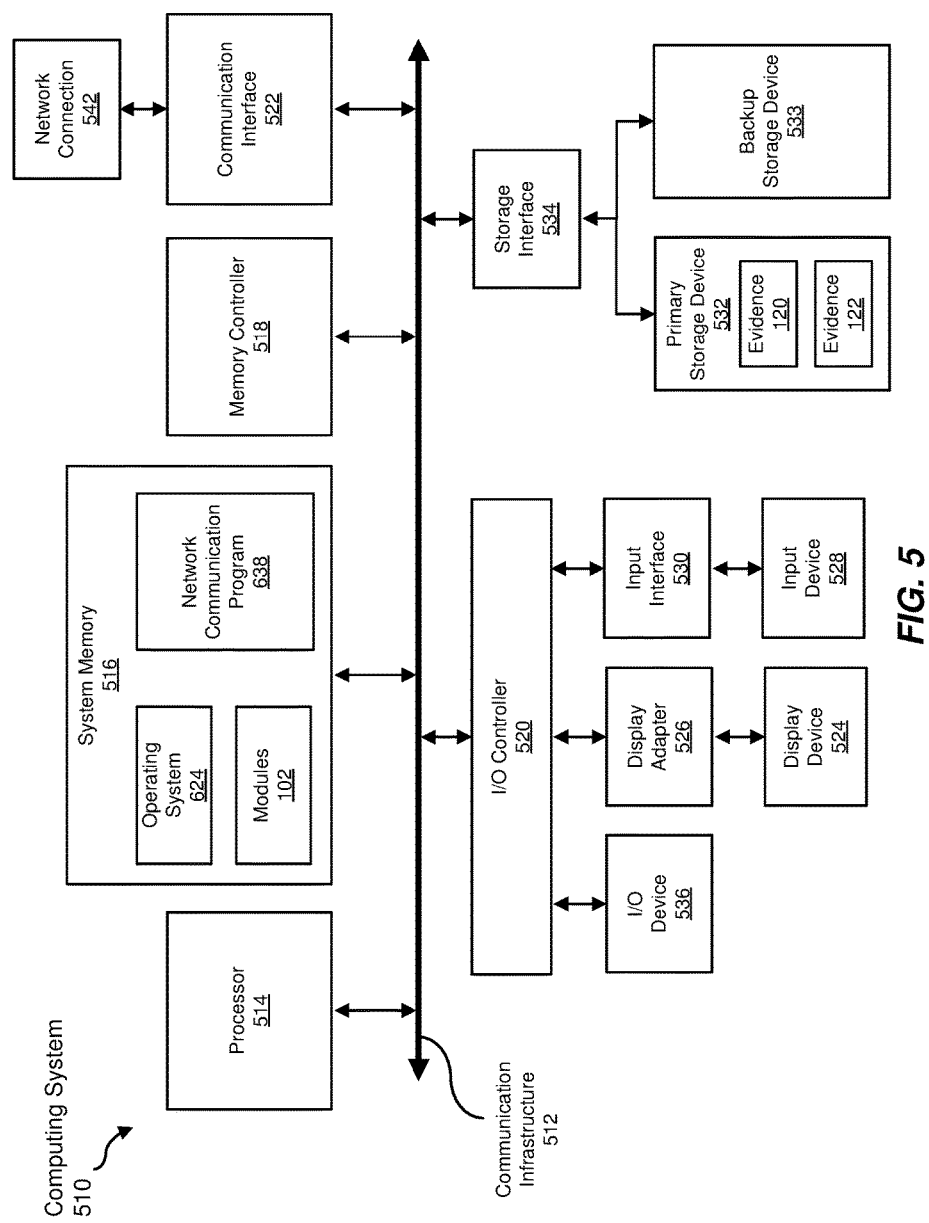
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, primary evidence 120 and corroborating evidence 122 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
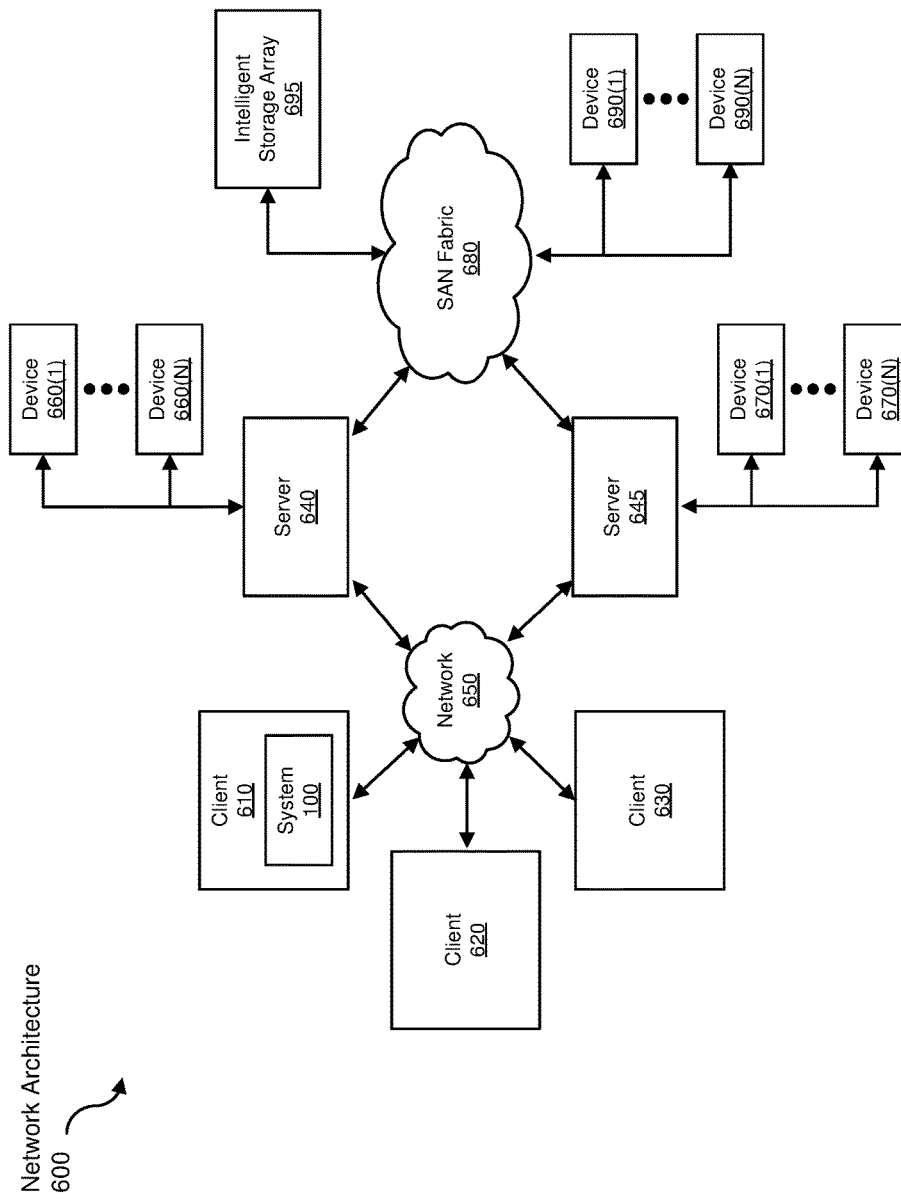
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting credential theft.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive information that may be indicative of a credential theft to be transformed, transform the information into primary evidence of the credential theft and corroborating evidence of the credential theft, output a result of the transformation to a security system, use the result of the transformation to initiate and perform a security action to prevent or report the credential theft, and store the result of the transformation to a system for storing evidence of credential thefts. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting credential theft, at least a portion of the method being performed by a computing device comprising at least one processor, the method comprising:
    monitoring a secured computing system's credential store that comprises at least one sensitive credential that is used to facilitate authentication of a user that is attempting to access the secured computing system;
    gathering, while monitoring the credential store, primary evidence of a possible attempted theft of the sensitive credential from the credential store, wherein:
        the primary evidence comprises evidence of a suspicious access of the sensitive credential from the credential store by a computer process that is not known to perform any part of a legitimate procedure of authenticating users; and
        the primary evidence is not alone sufficient to show, above a predetermined confidence level, actual theft of the sensitive credential;
    tracking usage of the sensitive credential to gather, in response to the primary evidence, corroborating evidence of the possible attempted theft of the sensitive credential by performing at least one of:
        detecting an attempt to exfiltrate the sensitive credential from the secured computing system;
        detecting a use of the secure credential in attempting to launch a computer process within the secured computing system; or
        detecting an attempt to access the secured computing system using the secure credential, wherein the corroborating evidence is, alone or in combination with the primary evidence, sufficient to show, above the predetermined confidence level, actual theft of the sensitive credential; and
    automatically performing a security action in response to gathering the primary evidence and the corroborating evidence of the possible attempted theft.

2. The computer-implemented method of claim 1, wherein tracking usage of the sensitive credential to gather the corroborating evidence of the possible attempted theft of the sensitive credential comprises detecting the attempt to exfiltrate the sensitive credential from the secured computing system.

3. The computer-implemented method of claim 2, wherein performing the security action comprises blocking the attempt to exfiltrate the sensitive credential from the secured computing system.

4. The computer-implemented method of claim 2, wherein:
    the suspicious access of the sensitive credential from the credential store
        generates a copy of the sensitive credential within the secured computing system;
    detecting the attempt to exfiltrate the sensitive credential from the secured computing system comprises:

tracking, in response to gathering the primary evidence of the possible attempted theft, additional copies of the sensitive credential that are derived from the copy of the sensitive credential as the additional copies are propagated throughout the secured computing system; and
detecting an attempt to exfiltrate one of the additional copies from the secured computing system.

5. The computer-implemented method of claim 1, wherein tracking usage of the sensitive credential to gather the corroborating evidence of the possible attempted theft of the sensitive credential comprises detecting the use of the secure credential in attempting to launch the computer process within the secured computing system.

6. The computer-implemented method of claim 5, wherein performing the security action comprises preventing the computer process from performing any malicious action within the secured computing system.

7. The computer-implemented method of claim 1, wherein tracking usage of the sensitive credential to gather the corroborating evidence of the possible attempted theft of the sensitive credential comprises detecting the attempt to access the secured computing system using the secure credential.

8. The computer-implemented method of claim 7, wherein performing the security action comprises blocking the attempt to access the secured computing system.

9. The computer-implemented method of claim 1, wherein performing the security action comprises blocking the possible attempted theft of the sensitive credential.

10. The computer-implemented method of claim 1, wherein performing the security action comprises alerting an interested party of the possible attempted theft.

11. The computer-implemented method of claim 1, wherein performing the security action comprises revoking access rights associated with the sensitive credential.

12. The computer-implemented method of claim 1, wherein performing the security action comprises alerting an interested party of a breach of the secured computing system.

13. A system for detecting credential theft, the system comprising:
a monitoring module, stored in memory, that:
monitors a secured computing system's credential store that comprises at least one sensitive credential that is used to facilitate authentication of a user that is attempting to access the secured computing system;
gathers, while monitoring the credential store, primary evidence of a possible attempted theft of the sensitive credential from the credential store, wherein:
the primary evidence comprises evidence of a suspicious access of the sensitive credential from the credential store by a computer process that is not known to perform any part of a legitimate procedure of authenticating users; and
the primary evidence is not alone sufficient to show, above a predetermined confidence level, actual theft of the sensitive credential;
a corroborating module, stored in memory, that tracks usage of the sensitive credential to gather, in response to the primary evidence, corroborating evidence of the possible attempted theft of the sensitive credential by performing at least one of:
detecting an attempt to exfiltrate the sensitive credential from the secured computing system;
detecting a use of the secure credential in attempting to launch a computer process within the secured computing system; or
detecting an attempt to access the secured computing system using the secure credential, wherein the corroborating evidence is, alone or in combination with the primary evidence, sufficient to show, above the predetermined confidence level, actual theft of the sensitive credential;
a security module, stored in memory, that automatically performs a security action in response to the primary evidence and the corroborating evidence of the possible attempted theft; and
at least one physical processor that executes the monitoring module, the corroborating module, and the security module.

14. The system of claim 13, wherein the corroborating module tracks usage of the sensitive credential to gather the corroborating evidence of the possible attempted theft of the sensitive credential by detecting the attempt to exfiltrate the sensitive credential from the secured computing system.

15. The system of claim 14, wherein the security module performs the security action by blocking the attempt to exfiltrate the sensitive credential from the secured computing system.

16. The system of claim 13, wherein the corroborating module tracks usage of the sensitive credential to gather the corroborating evidence of the possible attempted theft of the sensitive credential by detecting the use of the secure credential in attempting to launch the computer process within the secured computing system.

17. The system of claim 16, wherein the security module performs the security action by preventing the computer process from performing any malicious action within the secured computing system.

18. The system of claim 13, wherein the corroborating module tracks usage of the sensitive credential to gather the corroborating evidence of the possible attempted theft of the sensitive credential by detecting the attempt to access the secured computing system using the secure credential.

19. The system of claim 18, wherein the security module performs the security action by blocking the attempt to access the secured computing system.

20. A non-transitory computer-readable medium comprising one or more computer-executable instructions that, when executed by at least one processor of a computing device, cause the computing device to:
monitor a secured computing system's credential store that comprises at least one sensitive credential that is used to facilitate authentication of a user that is attempting to access the secured computing system;
gather, while monitoring the credential store, primary evidence of a possible attempted theft of the sensitive credential from the credential store, wherein:
the primary evidence comprises evidence of a suspicious access of the sensitive credential from the credential store by a computer process that is not known to perform any part of a legitimate procedure of authenticating users; and
the primary evidence is not alone sufficient to show, above a predetermined confidence level, actual theft of the sensitive credential;
track usage of the sensitive credential to gather, in response to the primary evidence, corroborating evidence of the possible attempted theft of the sensitive credential by performing at least one of:

detecting an attempt to exfiltrate the sensitive credential from the secured computing system;

detecting a use of the secure credential in attempting to launch a computer process within the secured computing system; or detecting an attempt to access the secured computing system using the secure credential, wherein the corroborating evidence is, alone or in combination with the primary evidence, sufficient to show, above the predetermined confidence level, actual theft of the sensitive credential; and automatically perform a security action in response to gathering the primary evidence and the corroborating evidence of the possible attempted theft.

* * * * *